Nov. 2, 1965 A. G. RAMBOLD 3,215,533
BEVERAGE INFUSION DEVICE
Filed Aug. 13, 1963 4 Sheets-Sheet 1
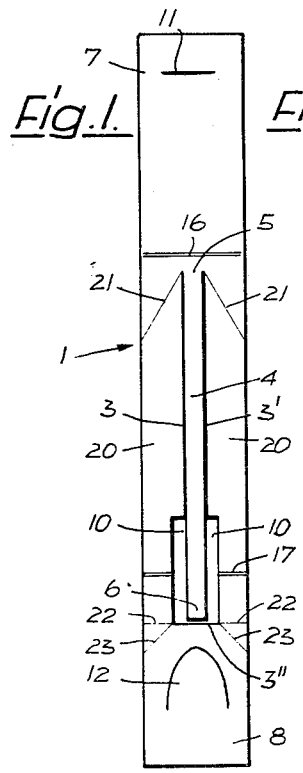
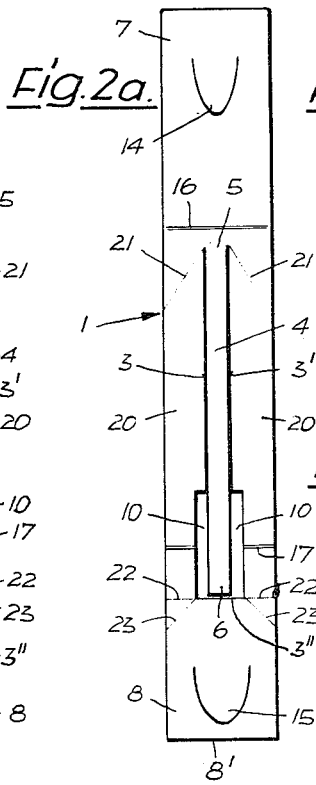
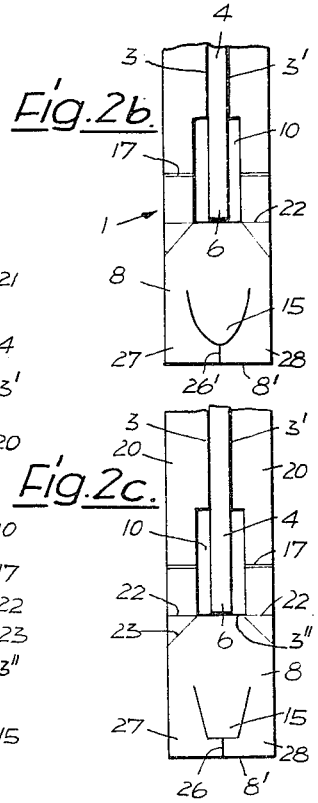
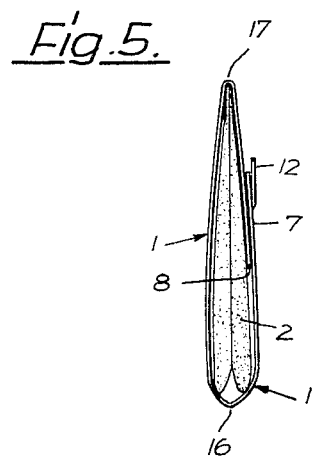
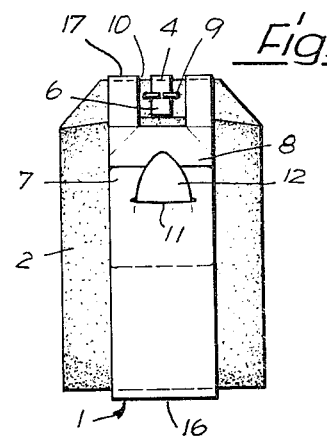
Inventor:
Adolf Rambold Nov. 2, 1965  A. G. RAMBOLD  3,215,533
BEVERAGE INFUSION DEVICE
Filed Aug. 13, 1963  4 Sheets-Sheet 2
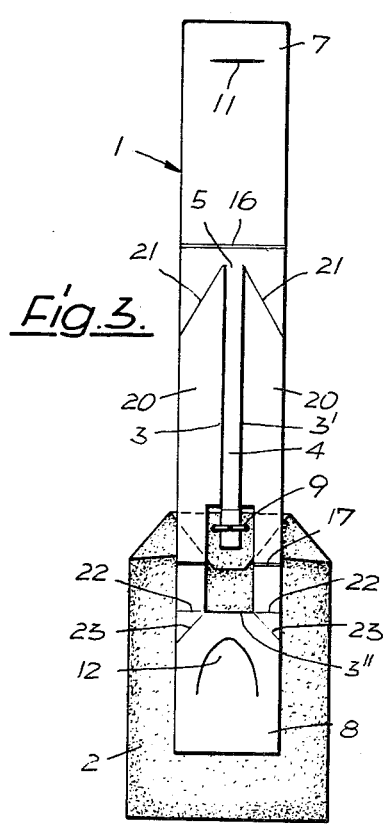
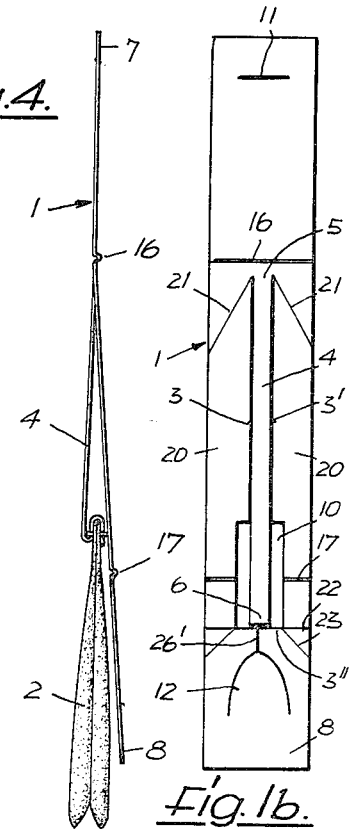
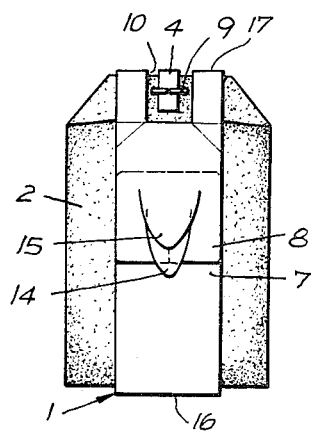
Inventor:
Adolf Rambold Nov. 2, 1965  A. G. RAMBOLD  3,215,533
BEVERAGE INFUSION DEVICE
Filed Aug. 13, 1963  4 Sheets-Sheet 3
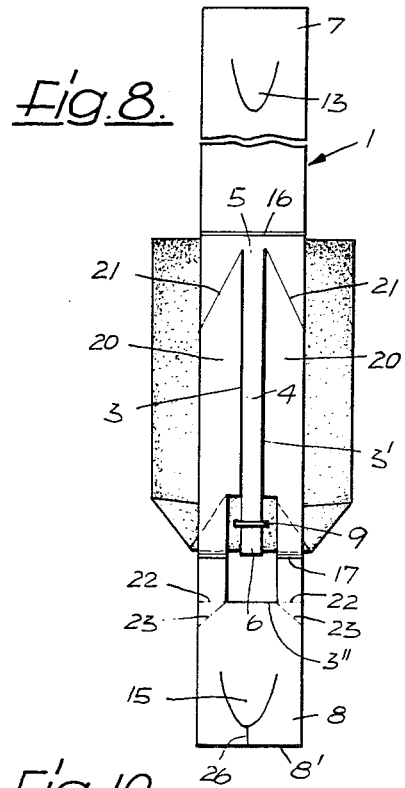
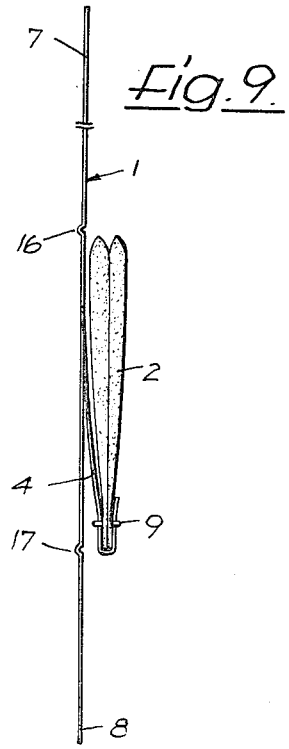
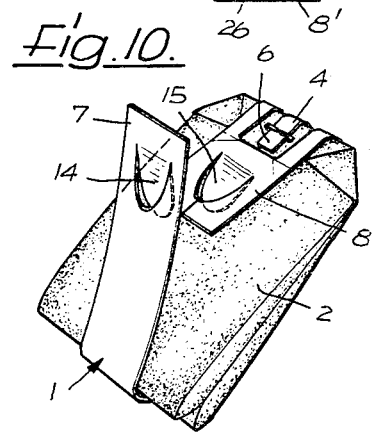
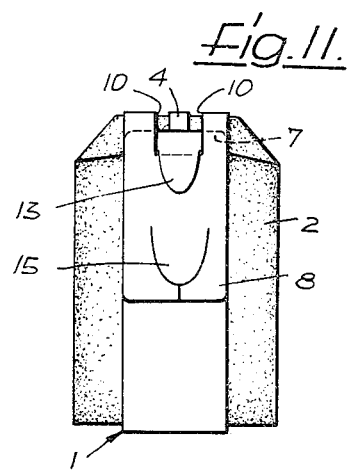
Inventor:
Adolf Rambold
by Ernest G Montague
Attorney Nov. 2, 1965  A. G. RAMBOLD  3,215,533
BEVERAGE INFUSION DEVICE
Filed Aug. 13, 1963  4 Sheets-Sheet 4

Inventor:
Adolf Rambold
By Ernest Montague
Attorney

United States Patent Office 3,215,533
Patented Nov. 2, 1965

3,215,533
BEVERAGE INFUSION DEVICE
Adolf Gustav Rambold, Alter Kirchweg 39, Buderich
near Dusseldorf, Germany
Filed Aug. 13, 1963, Ser. No. 301,853
Claims priority, application Germany Aug. 18, 1962
R 33,352
10 Claims. (Cl. 99—77.1)

The present invention relates to a wrapper in the form of a band, preferably of paper, carboard, or the like, which is folded around a teabag or the like and the ends of which are connected to each other in which the teabag or the like is secured to one end of a holding strip which may be severed from the longitudinal center of the wrapper band and is provided with a handle portion at the other end.

There is already a known wrapper band for a teabag of the above-mentioned type which is provided with a continuous central longitudinal strip which may be severed from the wrapper and is connected at one end to the teabag by means of a staple, while its other end is enlarged to form a tab or label which may also serve as a handle. When the teabag is to be used, the strip is completely severed from the wrapper band and used to suspend the teabag in a teapot, cup or the like, while the remainder of the wrapper band is thrown away.

The principal objects of the present invention are to provide a wrapper band for a teabag or the like which may be produced at a minimum of waste in material, which because of its particular shape and design may be used not only in the manner in which the known wrapper band could be used, but also in various other manners, and which for such use permits almost the entire material of which the wrapper band is made to be employed. More specifically, it is one of the objects of the invention to prevent the strip to which the teabag is connected from dropping into a teapot, tea cup or tea glass, and without requiring any additional material for this purpose beyond that which was previously required for producing a wrapper band.

For attaining the above-mentioned objects, the invention provides a wrapper band of the general type as mentioned in the beginning which is designed so that its two ends extend beyond the length of the holding strip for the teabag and wherein the end of this strip to which the teabag is secured is severed from the wrapper band. The holding strip with the teabag thereon is therefore not severed completely from the wrapper band, but the wrapper band forms a support to which the teabag is connected by means of the holding strip and which may be placed over the opening of a teapot, tea cup or tea glass. In this connection it is a feature of the invention that from the point at which it is connected to the wrapper band the holding strip first extends substantially within its original plane, that is, the plane of the wrapper band, so that the holding strip is prevented from tearing at its point of connection to the wrapper band.

In order to permit the wrapper band to be folded easily around the teabag this band is preferably provided with a pair of transverse impressed grooves which are located near the end of the holding strip which is connected to the wrapper band and near the slot in the wrapper band where the other end of the holding strip is severed from the wrapper band. These transverse grooves also facilitate the employment of the wrapper band for attaining a further object, namely, to serve as a drip catcher on the spout of a teapot. The wrapper band is for this purpose slipped over the spout of the teapot by the use of an opening which is formed in the wrapper band by cutouts or by tearing the enlarged end of the holding strip out of the wrapper band. This is done in such a manner that the slot which is formed in the wrapper band when the holding strip is bent out of the plane of the band extends in the direction toward the opening of the teapot through which the holding strip with the teabag connected thereto is inserted into the pot. The extension of the holding strip into the teapot opening does not interfere with the closing of the pot by its lid and there is also no danger that by fitting the lid on the pot the holding strip might be damaged. The wrapper band may in this manner be attached near one end to the spout of the teapot, while its other end rests on the edge of the opening of the teapot or on the lid.

For insuring that the wrapper band will tightly engage with the lower side of the spout so that no drop of liquid can run past the wrapper band when the tea is poured it is advisable to provide the wrapper band with additional grooves or the like which will be subsequently described in greater detail.

The two ends of the wrapper band which extend beyond the length of the holding strip are provided with closure means which include one or two tongues which are produced by slots in the material of the wrapper band. The sides of at least one tongue are preferably wedge-shaped so that by a self-locking action the closure is prevented from opening accidentally.

The wrapper band according to the invention is designed so that it may also be secured to the handle of a glass or cup. If it is desirable that it may be connected to handles of particular shapes, the wrapper band may also be provided with one or more additional grooves in the area adjacent to that which is to be connected to the handle.

The length of the wrapper band depends upon the size of the teabag. Since the holding strip does not extend along the entire length of the wrapper band, it may be made relatively short so that, when the teabag thereon is suspended in a teapot while the wrapper band is placed transversely over the opening of the pot or over the spout and the edge of the pot opening or the lid, the teabag will not lie on the bottom of the pot but will hang in the pot which insures a better extraction of its contents. Furthermore, the ends of the wrapper band which extend beyond the length of the holding strip may be employed for instructions or advertisements which may, for example, be printed thereon.

The features and advantages of the present invention will become more clearly apparent from the following detailed description thereof which is to be read with reference to the accompanying drawings, in which—

FIGURE 1 shows a development of a wrapper band according to one embodiment of the invention;

FIGURE 1b shows a modification of the embodiment according to FIGURE 1;

FIGURE 2a shows a development of a wrapper band according to a modification of the invention;

FIGURES 2b and 2c show parts of a wrapper band according to two modifications of the wrapper according to FIGURE 2a;

FIGURES 3 and 4 show an elevation and a side view of a wrapper band according to FIGURE 1 with a teabag secured thereto;

FIGURES 5 and 6 show a side view and an elevation of a teabag enclosed in a wrapper band according to FIGURES 3 and 4;

FIGURE 7 shows an elevation of a teabag enclosed in a wrapper band according to FIGURE 2b;

FIGURES 8 and 9 show an elevation and a side view of a wrapper band according to a modification of the wrapper band as shown in FIGURES 3 and 4, and also with a teabag secured thereto;

FIGURE 10 shows a perspective illustration of the means for closing a wrapper band on a teabag according to FIGURES 8 and 9;

FIGURE 11 shows an elevation of a teabag with a wrapper band according to FIGURES 8 and 9 thereon and with closure means similar to those as illustrated in FIGURE 7, but fitted together in a different manner;

FIGURE 14 shows a perspective view of a teacup with a wrapper band locked to the handle of the cup and a teabag suspended on the wrapper band in the cup; while

Figure 12:
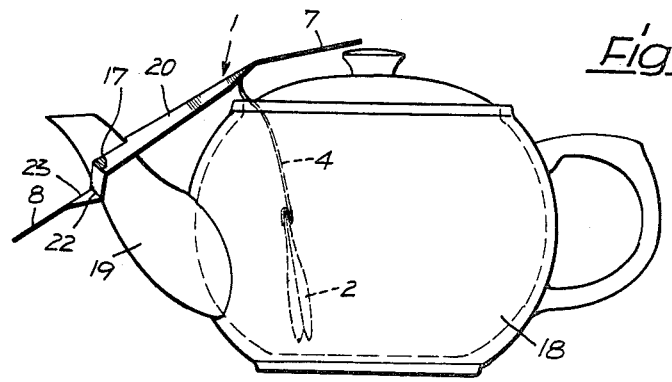
FIGURES 12 and 13 show a side view and a front view of a teapot with a wrapper band carrying a teabag attached to the spout of the pot and serving as a drip catcher.

As illustrated in FIGURES 1, 3, 4, 5, and 6 the wrapper band according to the invention consists of a rectangular band 1 of a tough paper or thin cardboard of a length sufficient to permit it to be laid around a teabag 2 and its ends to be connected to each other. The width of band 1 depends upon certain factors which will be subsequently described.

Wrapper band 1 is provided with a narrow central strip 4 for holding a teabag 2 which is formed by a pair of parallel longitudinal slits 3 and 3' in band 1 intermediate and spaced from its ends and which is integrally connected at one end 5 to band 1 while its other end 6 is severed from band 1 by a transverse third slit 3'' so that strip 4 may be loosened from the wrapper band. The two ends 7 and 8 of band 1 outside of strip 4 serve as handles, as supports of closure means and, if desired, also as surfaces on which, for example, advertisements or operating instructions may be printed.

As illustrated in FIGURES 3 and 4, the free end of strip 4 is connected to a teabag 2, preferably by means of a wire staple 9. Since the width between the two arms of this staple 9 is usually greater than the width of strip 4, a pair of apertures 10 are cut out of band 1 at both sides of strip 4 and parallel thereto. Parallel to the longitudinal edges of strip 4 these apertures 10 are defined by a first and second parallel straight line, each of which is equally spaced at such a distance from the first or second longitudinal slit 3, 3' that the distance between these two straight lines is greater than the length of the staple 9. Transversely to these first and second parallel lines, apertures 10 are defined by a third straight line which is in alignment with the third slit 3'' and by a straight line which extends parallel to and is spaced from this third straight line. The apertures which are thus formed in the wrapped band therefore permit the staple 9 to be clipped to teabag 2 and over the free end of strip 4 in a manner so that no parts of band 1 except strip 4 will be in engagement with staple 9. The small parts which are cut out when the apertures 10 are formed constitute the only waste of material which occurs in the production of the final wrapper band. All other parts of the original band of which the wrapper is made are utilized for the purposes which are to be achieved by the final wrapper band.

Instead of cutting out these parts forming the apertures 10 entirely, it is, however, also possible merely to indent or perforate these parts along the lines facing the band 1 so that they may later be severed therefrom along these lines. Strip 4 is then provided with a wider free end through which the staple 9 is clipped.

For connecting the ends 7 and 8 of band 1, one of these ends is provided with a transverse slit 11 and the other end with a tongue 12 which is formed by an arcuate slit. After band 1 is laid around the teabag 2, this tongue 12 may be inserted from the inside toward the outside through the transverse slit 11, as illustrated in FIGURES 5 and 6, so that the tip of tongue 12 points toward the stapled end of strip 4.

In order to permit the wrapper band to be more easily folded around the teabag, the band may be provided with a pair of transverse grooves 16 and 17 which are impressed near the end 5 of strip 4 which is connected to the body of band 1 and near the free end 6 of strip 4.

Instead of connecting the teabag 2 to the holding strip 4 in the manner as shown in FIGURES 3 and 4, the teabag may also be connected to the strip by extending from its free end in the direction opposite to that as shown in FIGURES 8, 9, and 11. In this case, the free end 6 of strip 4 will only be folded directly over the head of the teabag and will not be folded twice as shown in FIGURE 4. Thus, there will be one web of paper of the strip 4 less at the point of its connection to the head of the teabag. This type of connection of the teabag 2 also has the advantage that, when the teabag is suspended on the strip 4 into a teapot or tea cup it will stay therein in a substantially horizontal position. In this case tongue 15 may be omitted in the end 8 of band 1 and the other end 7 of band 1 which then has to be longer is not provided with a transverse slit 11 but with a curved slit to form a tongue 13 which, when the end 7 is folded over the teabag 2 and placed under the other end 8 of the wrapper band, as shown in FIGURE 11, can then be passed from the inside through the opening which is formed by the apertures 10 and be hooked over the edge of this opening.

Another manner of designing the wrapper band is illustrated in FIGURES 2a and 7 and consists in providing each end 7 and 8 thereof with a tongue 14 and 15, respectively, which extend in the same direction so that when the band is folded around the teabag 2, one of these tongues may be inserted through the other tongue. It is advisable in all cases to cut at least the tongue which is to be passed through the other so as to have a wedge-like shape. It may then be drawn tightly through the other tongue or slot and be locked thereon and the wrapper band 1 will then fit tightly around the teabag 2.

Figure 13:
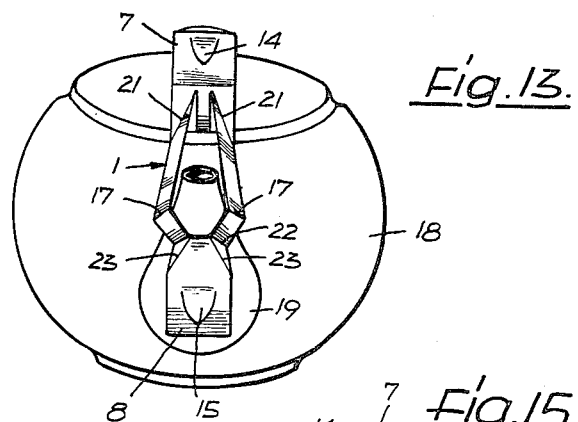

As shown in FIGURES 12 and 13, the wrapper band 1 may be used for the purpose of suspending the teabag 2 on the holding strip 4 in a teapot 18 in such a manner that the holding strip 4 and the teabag 2 thereon will be prevented from slipping to the bottom of the pot. The wrapper band 1 as shown in FIGURES 12 and 13 is one according to the embodiment of the invention as illustrated in FIGURES 2a and 7. The other embodiments may be employed in the same manner and are therefore also provided with grooves, the purpose of which will be subsequently described.

The wrapper band 1 may be secured to the teapot 18 in a manner so that it may also serve as a drip catcher on the spout 19 of the pot. For this purpose, the wrapper band 1 is slipped with the opening which is formed by the apertures 10 over the spout 19 of the teapot 18, while the opposite end of the band is placed on the edge or the lid of the teapot. In order to insure that the wrapper band will closely engage with the spout 19, especially on the lower side thereof, the lateral parts 20 of the wrapper band at both sides of the longitudinal slits 3 and 3', as shown, for example, in FIGURES 1 and 2a, are provided near the end 5 of the holding strip 4 with a pair of grooves 21 or the like which are impressed into the material of band 1 and start from the outer edges thereof and converge toward the end 5 of the holding strip 4 which is connected to the wrapper band. These grooves 21 permit the parts 20 to be bent at an angle relative to each other and relative to the upper part 7 of the wrapper band. At the free end 6 of strip 4, wrapper band 1 is further provided with a transverse groove 22 and a pair of grooves 23 which start from the lower corners of apertures 10 and diverge toward the outer longitudinal edges of the end portion 8 of the wrapper band. Due to the grooves 21, 22, and 23, the lateral parts 20 of wrapper band 1 will easily bend apart when the latter is fitted over the spout 19 of a teapot 18, as shown particularly in FIGURE 13, and the wrapper band 1 will then engage firmly with the lower side of the spout 19 and will thus catch any drop of liquid which might run down from the tip of the spout.

Figure 14:
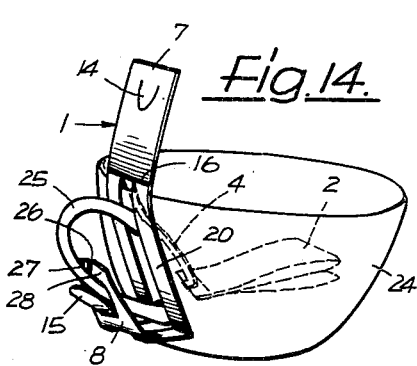
Figure 15:
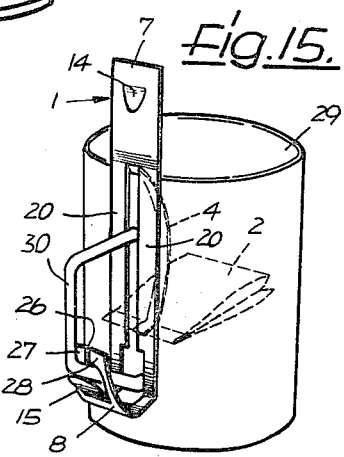
FIGURE 15 shows a perspective view of a tea glass with a wrapper band locked to the handle of the glass and a teabag suspended on the wrapper band in the glass.

If the wrapper band is to be used for suspending a teabag in a cup 24 or a tea glass 29 and should be fastened to the handle 25 or 30 thereof, as shown in FIGURES 14 and 15, band 1 is preferably designed so that the tongues 14 and 15 extend in such a direction that the tip of the tongue 15 on the end of the band where the holding strip 4 is severed from the band points toward the outer edge 8', and the end portion 8 of the band has a central slit 26 which extends from the tip of tongue 15 to the edge 8', as shown particularly in FIGURES 2b and 2c which differ from each other merely by the shape of tongue 15.

The slot in the wrapper band 1 which is formed by bending the holding strip 4 away from it may then be slipped over the handle 25 or 30 of the cup or glass, and the end 8 of the band with the slit 26 therein may be bent outwardly and be locked to the handle 25 or 30. This may be done by applying the tongue 15 from below against the handle 25 or 30 and by bending the arms 27 and 28 of the end 8 of the wrapper band adjacent to tongue 15 which are separated by the slit 26 upwardly and over the handle in the manner as illustrated in FIGURES 14 and 15.

If the wrapper band 1 is of the design as shown in FIGURES 2b or 2c, and the teabag 2 is secured to it in the manner as shown in FIGURES 8 and 9, the band may be folded around the teabag and the end 7 of the band be placed on the other end 8. The two ends of the wrapper band may then be connected by inserting the tongue 14 into the slit which is formed by the tongue 15, as indicated in FIGURE 10, so that the parts 27 and 28 of the end 8 of the band will then be visible in the aperture which is formed by tongue 14.

In certain cases it may be advisable also to provide a wrapper band according to the embodiment as shown in FIGURE 1 with a slit 26' similar to the slit 26 (FIGURES 2b and 2c) which, as shown in FIGURE 1b, then extends from the tip of tongue 15 along the longitudinal center of the wrapper band to the aperture 10. This slit 26' may, for example, be useful in the event that the handle of a cup or glass is longer than the slot which is formed when the holding strip 4 is being cut out.

Although my invention has been illustrated and described with reference to the preferred embodiments thereof, I wish to have it understood that it is in no way limited to the details of such embodiments, but is capable of numerous modifications within the scope of the appended claims.

I claim:

1. An infusion device for preparing a beverage comprising in combination, an infusion bag with a quantity of infusible substance therein, a wrapper band secured thereto and adapted to be folded around said bag comprising a substantially rectangular band of tough paper having a pair of longitudinal parallel slits forming first and second slits at opposite sides of the longitudinal center of said band and terminating at points spaced from the opposite end portions of said band in order to form a strip within said band, said strip having a length equal to the length of said longitudinal slits, and having a first end integral with said band and having a second free end severed from said band and including an end margin, and said strip swinging out from said band between said first end and said second free end, for subsequent securing said band about said bag, a staple connecting said strip near said second free end to one end of the bag, and means for connecting said ends of said band to each other upon folding said band around said bag.

2. The wrapper band, as set forth in claim 1, in which said band has a pair of substantially rectangular areas beneath the free end of said strip, each of said areas being defined by one of said longitudinal slits and by a substantially straight outer line spaced from and substantially parallel to said longitudinal slits, said two outer lines forming a first and a second line spaced at a distance from each other greater than the length of said staple, both of said areas being further defined by a third line in substantially straight alignment and partially coinciding with said end margin upon aligning said strip with said band and by a fourth line parallel to and spaced from said third line, and said band being formed along said four lines, so as to permit said areas to be easily severed from said band.

3. The wrapper band, as set forth in claim 2, wherein said four lines are slits in said band.

4. The wrapper band, as set forth in claim 1, wherein said band has a pair of transverse grooves, one of said transverse grooves being located near the end of said strip connected to said band and the other transverse groove near the free end margin of said strip, said transverse grooves being spaced from each other at a distance substantially equal to the length of said bag, to permit said band to be more easily folded around said bag.

5. The wrapper band, as set forth in claim 4, wherein said band has a first pair of oblique grooves extending from two opposite points on the outer longitudinal edges of said band and converging toward the ends of said longitudinal slits where said strip remains connected to said band, said band having a second pair of oblique grooves spaced from said first pair of oblique grooves and extending from two opposite points on the outer longitudinal edges of said band and converging toward said third line defining said areas, said band having a further transverse groove in substantially straight alignment with said third line.

6. The wrapper band, as set forth in claim 1, wherein said connecting means comprise a tongue cut out of one end portion of said band and located between the free end of said strip upon aligning the latter with said band and the adjacent end of said band, said tongue being tapered toward its free end and pointing toward said strip, said band having a further transverse slit in the other end portion thereof, said tongue being adapted when said band is folded around said bag first to be placed underneath said end portion of said band containing said transverse third slit and then to be passed from the inner side toward the outside through said third slit.

7. The wrapper band, as set forth in claim 1, wherein said connecting means comprise a pair of tongues cut out of said band and each being located between one end of said strip and the adjacent end of said band, the free ends of said tongues pointing in the same direction, one of said tongues being adapted when said band is folded around said bag first to be placed underneath the other tongue and then to be passed from the inner side toward the outside through said other tongue.

8. The wrapper band, as set forth in claim 2, wherein said connecting means comprise a tongue cut out of the first end portion of said band and located between the first end of said strip connected to said band and the adjacent end of said band and tapered toward its free end and pointing toward said strip, said bag being secured by said staple to the free end of said strip in a manner so that, before said band is folded around said bag, said bag is located between said opposite end portions of said band, the unconnected end of said bag then extending toward said first end of said strip and toward said tongue, said tongue being adapted when said band is folded around said bag first to be placed underneath the second end portion of said band and then to be passed from the inner side toward the outside through an aperture formed by said four lines upon cutting out said areas.

9. The wrapper band, as set forth in claim 7, wherein the free end of one of said tongues points toward the free end of one end portion of said band, and said end portion has a central longitudinal slit between said free end of said end portion and the opening formed by said tongue.

10. The wrapper band, as set forth in claim 6, wherein a central longitudinal slit is provided in said band between the opening formed by said tongue and the opening formed by said four lines upon severing said areas and said free end of said strip from said band.

References Cited by the Examiner

UNITED STATES PATENTS

| | | | |
|---|---|---|---|
| 1,362,054 | 12/20 | Stockman | 99—77.1 |
| 1,723,702 | 8/29 | Mitchell | 99—77.1 |
| 2,835,057 | 5/58 | Mathews | 99—77.1 |
| 2,879,613 | 3/59 | De Mario | 99—77.1 X |

A. LOUIS MONACELL, *Primary Examiner.*

RAYMOND N. JONES, *Examiner.*